Patented July 5, 1932

1,865,544

UNITED STATES PATENT OFFICE

WALTER SCHOELLER, OF BERLIN-CHARLOTTENBURG, HANS JORDAN, OF BERLIN-STEG-LITZ, AND REINHARD CLERC, OF BERLIN, GERMANY, ASSIGNORS TO SCHERING-KAHLBAUM A.-G., OF BERLIN, GERMANY

PRODUCTION OF THYMOL

No Drawing. Application filed June 29, 1928, Serial No. 289,324, and in Germany July 15, 1927.

Our invention refers to the production of thymol. As it is shown in the applications for patent of the United States, Serial No. 200,289, filed by Hans Jordan June 20, 1927 and Ser. No. 287,639, filed by Walter Schoeller, Hans Jordan and Reinhard Clerc June 22, 1928, various condensation products are obtained by condensation of meta-cresol and acetone, according to the conditions selected. At a temperature somewhat above room temperature but below 100° C. a polymerization product of the formula $C_{20}H_{24}O_2$ which contains but one hydroxyl group capable of acetylation is obtained upon condensation of meta-cresol and acetone in the presence of an acidic condensation medium. This product probably has the following formula:

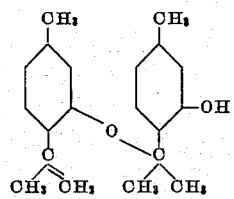

At a lower temperature of approximately from 0° C. to 10° C., a condensation product of the formula $C_{17}H_{20}O_2$ is produced containing in the molecule two hydroxyl groups capable of acetylation, and which probably has the following formula:

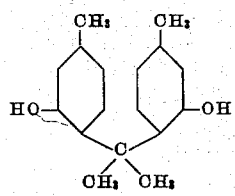

These condensation products yield on splitting by thermal treatment 3-methyl-6-isopropylene-phenol which can be hydrogenated by treating with hydrogen in the presence of a hydrogenation catalyst to thymol.

Methyl-isopropylene phenol, however, particularly on heating, exhibits the tendency to polymerize back, whereby difficulties of manufacturing may occur.

We have now found that this polymerization is avoided and the manufacture of thymol facilitated if the condensation products of meta-cresol and acetone described above are first acylated and then subjected to the thermal decomposition. The acyl compounds of 3-methyl-6-isopropylene thus obtained, show no tendency to polymerization, they can be transformed by treating with hydrogen in the presence of a hydrogenation catalyst into thymol-acylate and subsequently by saponifying into thymol.

The acylating of the condensation-product from meta-cresol and acetone is effected in the usual manner for example by boiling with acetic anhydride in the presence of sodium acetate or sulphuric acid.

The following examples illustrate the invention:

Example 1

The monoacetylcompound of the formula

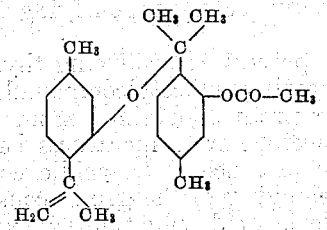

of the condensation product from meta-cresol and acetone melting at 122°–123° C., which can be obtained by condensing meta-cresol and acetone by means of an acidic condensing agent at a temperature of 30–40° C. and then acetylating, is heated in a distillation vessel to about 300–320° C. this condensation product having the following formula

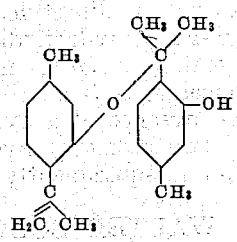

A mixture of methyl isopropylene-phenol-acetate and methyl-isopropylene-phenol distills over. This mixture in the presence of a nickel catalyst is then hydrogenated to thymol and thymol acetate by treating with hydrogen in the presence of a hydrogenation catalyst. By saponification of the mixture, the acetate is converted into thymol.

*Example 2*

The diacetylcompound of 4,4'-dimethyl-2,2'-dihydroxydiphenyldimethylmethane melting at 84–85° C. which can be obtained according to Example 1 of the application for patent of the U. S. Ser. No. 287,639 filed June 22, 1928, is heated in a distillation vessel to about 310–330° C. It decomposes into cresol acetate and methyl isopropylene phenol acetate which in the presence of a nickel catalyst is then hydrogenated with the addition of 2 atoms of hydrogen and saponified to thymol.

Various changes may be made in the details disclosed in the foregoing specification without departing from the invention or sacrificing the advantages thereof.

We claim:

1. The process of producing thymol comprising heating an acylcompound of a condensation product obtained from meta-cresol and acetone at temperatures below 100° C. in the presence of an acidic condensing agent, belonging to the group consisting of hydrochloric acid, phosphorus oxychloride and anhydrous metallic chlorides and treating the acylcompound of 3-methyl-6-isopropylene-phenol thus obtained with hydrogen in the presence of a hydrogenation catalyst until two atoms of hydrogen have been taken up and subsequently saponifying the product.

2. The process of producing thymol comprising heating an acetylcompound of a condensation product obtained from meta-cresol and acetone at temperatures below 100° C. in the presence of an acidic condensing agent, belonging to the group consisting of hydrochloric acid, phosphorus oxychloride and anhydrous metallic chlorides and treating the acetylcompound of 3-methyl-6-isopropylene phenol thus obtained with hydrogen in the presence of a hydrogenation catalyst until two atoms of hydrogen have been taken up and subsequently saponifying the product.

3. The process of producing thymol comprising heating the diacetylcompound of 4,4'-dimethyl-2,2'-dihydroxydiphenyldimethylmethane and treating the methylisopropylenephenylacetate thus obtained with hydrogen in the presence of a hydrogenation-catalyst until two atoms of hydrogen have been taken up and subsequently saponifying the product.

WALTER SCHOELLER.
HANS JORDAN.
REINHARD CLERC.